June 14, 1960 L. A. RICHARDS 2,941,174
ELECTRICAL SENSING UNIT FOR MEASURING WATER IN POROUS MEDIA
Filed May 15, 1959

INVENTOR.
LORENZO A. RICHARDS
BY Hooper Linford

2,941,174

ELECTRICAL SENSING UNIT FOR MEASURING WATER IN POROUS MEDIA

Lorenzo A. Richards, 4455 5th St., Riverside, Calif.

Filed May 15, 1959, Ser. No. 813,529

9 Claims. (Cl. 338—35)

My invention relates to means for measuring moisture in porous media by making use of the fact that the electrical resistance and/or capacitance of a special sensing element depend on the water content of a standard granular porous medium in which electrodes are imbedded.

Among the objects of my invention are:

First, to provide means for continuously or intermittently measuring in situ, the water content of soil in the root zone of plants so that irrigation water can be applied when the water content has been reduced to a predetermined level.

Second, to provide means for continuously or intermittently measuring in situ, the water content of earth materials such as in dams, highway sub-grades, under airfields, and under building foundations.

Third, to provide a sensing element, responsive to soil water, that will be usable in automatic irrgation systems for turning on irrigation water when the soil water is depleted to a predetermined level, and turning off the water when the desired soil water condition has been restored.

Fourth, to provide means for measuring the moisture tension of water in agricultural soils, in earth dams, in foundations and sub-grades and also in industrial materials such as foundry sands.

With the above and other objects in view as may appear hereinafter, reference is directed to the accompanying drawings, in which.

Figure 1:
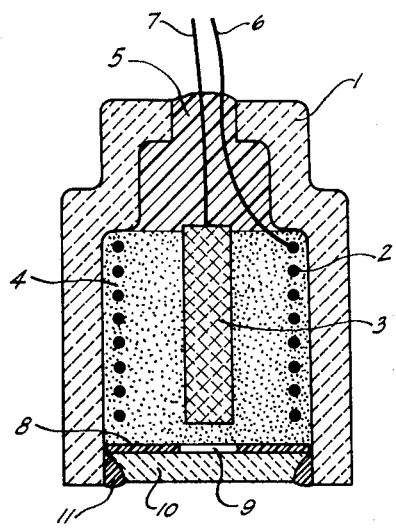
Figure 1 is a sectional view of a water-sensing unit having an electrical water-sensing element enclosed in a porous ceramic cup with the electrodes imbedded in the standard granular porous medium.

Electrical sensing units consisting of two spaced electrodes imbedded in cast gypsum, glass cloth or nylon cloth have long been experimented with as a means for measuring the water content of soil with which the units are placed in capillary contact. Results obtained with such units have not been entirely satisfactory. Resistance and capacitance measurements made with such units have not been found to accurately define water content or condition of the soil under all conditions. This is due in part at least to the fact that the water absorbing properties of these materials differ radically from those of soils. Moreover, although the gypsum unit has a desirable feature in that due to the slight solubility of gypsum it provides a buffering action in the soil moisture making the reading less sensitive to soil salts, the solubility is undesirable in that the calibration of gypsum units are found to change rather rapidly with time, i.e. as the gypsum dissolves. With glass or nylon cloth it is difficult to obtain satisfactory and constant contact with the electrodes. Thus, slight movement of the electrodes or variations of soil pressures around the units change the resistance and/or capacitance readings obtained.

It is desirable to have a moderate change in resistance and/or capacitance of the sensing elements over the whole soil moisture range that will permit plant growth. It is found however that with the gypsum units, the mentioned electrical properties change rapidly with small changes in moisture content in relatively dry soils and very slowly in wet soils, and with glass and nylon units the electrical properties change slowly in dry soils and very rapidly in wet soils. None of these units cover the full range of water content satisfactorily. By using soil or other standard porous materials as described hereinbelow for the sensing medium and having it contained in a rigid porous cup or container, the above and other difficulties as discussed herein are overcome.

Other means for determining soil moisture condition which for various reasons have not proven to be satisfactory include the use as electrodes of tinned iron stakes driven into the ground or carbon electrodes buried in the ground. Such arrangements might serve satisfactorily, except that the contact resistance between the electrodes and the soil is variable and troublesome. This variability comes mainly from the shrinking and swelling action that results from drying and wetting of the soil.

My invention consists in imbedding the measuring electrodes firmly in suitable soil or standard porous medium within a porous walled cup or cylinder. For general use, the soil is selected to have a moderate rate of change of water content over the whole range of water contents it is desired to measure. Moisture adjustment to the outside surrounding soil is made through the rigid protecting porous wall of the unit. The more complete this contact between soil and porous wall is, the more rapid the moisture adjustment takes place, but satisfactory operation of my sensing units is obtained with only a partial contact to the external soil. In other words, imperfect contact slows down the rate of response of my units to external moisture change, but does not change the calibration.

For purposes of explanation, attention is directed to the figures.

Figure 1 shows in longitudinal section a sensing unit having a sensing element contained in a porous cup 1. An outer electrode 2, is a helix of stainless steel wire, while an inner electrode 3 is a carbon rod. These electrodes are firmly imbedded in a standard granular porous medium 4, which extends through the helix and makes good moisture contact with the porous cup. The whole assembly is secured and protected from outside mechanical disturbance by the potting or sealing compound 5, which has high strength, low water absorption and high electrical resistance. Electrical leads 6 and 7 attached to the outer and inner electrodes, respectively, pass through seal 5 and are connected to an electrical measuring device not shown. The other end of the sensing unit is closed with an insulating disk 8 having one or more holes 9 therethrough, and a porous end plate 10 of coarse ceramic, the end plate being sealed in place to form the bottom of the porous cup by ring seal 11 of potting compound such as that used to seal the other end of said porous cup.

The outer electrode 2 is shown to be in the form of an expanded helix. One having a pitch of about 0.1 inch per turn is entirely satisfactory. In place of the helix a coarse screen made of stainless steel may be employed. The inner electrode 3 is shown to be carbon or graphite. It may also be made of stainless steel. The insulating disk 8 may be made of plastic, rubber, synthetic rubber or the like, its purpose being to minimize stray electrical currents outside the porous cup.

With the above described arrangement the electrical resistance and the electrical capacitance between the electrodes will be responsive to the moisture content of the standard medium within the porous cup. This medium is bounded at each end by electric insulation, and the outer electrode 2 shields the inner electrode 3, so that electrical properties of the external surrounding medium do not affect the electrical measurements. Electrical resistance and/or capacitance are determined by electrical measuring devices not shown in the drawings. Since electrical measuring devices for use in determining resistance and/or capacitance are well known, illustration here is considered unnecessary to an understanding of the present invention. By means of such measuring devices the resistance between electrodes is readily observed or recorded and changes in this electrical characteristic or in the capacitance can be translated to indicate moisture condition in the soil.

Figure 2:
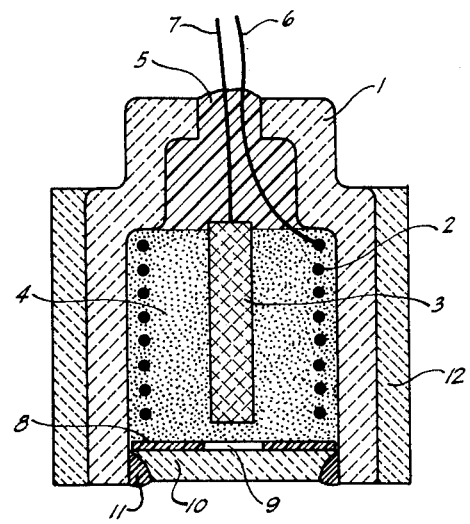
Figure 2 is the same as Figure 1 except that the unit is partially enclosed in a cast gypsum or plaster of Paris outer jacket.

Figure 2 is identical with Figure 1 except that a porous surrounding jacket 12, of cast gypsum has been added, particularly for use in saline soils where the buffering action of the gypsum makes the sensing element less responsive to soil salts.

Figure 3:
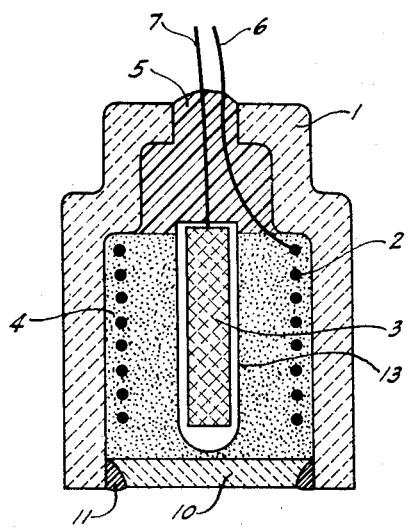
Figure 3 is the same as Figure 1 except that the central electrode is enclosed in an insulating jacket so that the element has high D.C. (direct current) resistance but is adaptable for A.C. (alternating current) capacitance measurements.

Figure 3 is identical with Figure 1 except that the inner electrode is surrounded by a thin, waterproof, insulating jacket 13, such as glass or epoxy resin or the like. This aids in the measurement of the electrical capacitance between the electrodes by cutting out the D.C. resistance component of the electrical impedance. The capacitance measurement is responsive to the water content of the standard medium and therefore has advantages over the resistance measurement because under some soil conditions the latter is seriously affected by soil salts. Furthermore, the use of the insulating jacket makes the use of insulating disk 8 (Fig. 1) unnecessary in this modification.

As indicated hereinabove, any suitable standard electrical bridge or measuring circuit can be used for reading the electrical resistance or capacitance of these elements and when calibrated, the status of water in the externally surrounding soil can thus be measured. Also, these sensing units can be used with suitable electric circuits and attendant controls for automatically irrigating soil.

The porous cups shown in the figures should be readily permeable to water. It has been found that a wall thickness of about 0.3 cm. with a permeance or hydraulic conductance of about 1 milliliter per minute per atmosphere pressure difference and with an air bubbling pressure between 1 and 2 atmospheres, is satisfactory. Porous ceramic material of this fineness transmits water readily over the whole plant growth moisture range.

To allow the escape of air from the unit during wetting processes, the air bubbling pressures for the porous end plate 9 should be less than 0.05 atmosphere. This air exchange between the standard soil inside the unit and the soil outside the unit takes place through the hole 9 in the insulating disk 8 and through the coarse pores in the end plate 10. Soil moisture tension or suction of the water in external soil is transmitted inside the unit through the walls of the ceramic case 1, but the electrical properties of the standard soil will not change until its moisture content changes. This requires free entry of air which is provided by the coarse end plate. Porous cups which have been found to be completely satisfactory have been about 2.5 cm. outside diameter and about 3 to 5 cm. long. However, these units may be larger or smaller than the indicated size without affecting the operability of the units.

The capillary properties of the granular porous medium used to imbed the electrodes within the unit are important and must be chosen with care.

The physical or hydraulic condition of moisture in porous media can be designated in terms of suction or moisture tension. Soil moisture tension is defined as the pressure reduction that must be maintained across a permeable membrane in order to bring about hydraulic equilibrium between free water in bulk that is not subject to surface force action and the absorbed water in the soil on the other side of the membrane that is subject to surface force action. The moisture content of soil at any given soil moisture tension can be determined by pressure membrane apparatus such as described in U.S. Patent 2,353,760.

It is the gradient in the soil moisture tension that determines the direction of absorbed liquid or film flow in porous media. At equilibrium the soil moisture tension in the standard medium inside the porous cup will be the same as in the soil outside the cup. Unfortunately, there is a hysteresis effect in the relation between moisture tension and moisture content for porous media. If, as is the case for irrigation control in agricultural soils, it is desired to measure the change in tension with time after thorough wetting, then once calibrated against moisture tension for the moisture release process extending from saturation, these moisture sensing units can be used to measure moisture tension in any soil with which they were in contact during the wetting process and in which they are allowed to remain at equilibrium during the drying out process. The standard capillary medium within the cup should be chosen so that the rate of change of moisture content with tension is made as large as possible over the tension range in which the unit is to be used.

In measuring soil moisture for agricultural purposes, the tension range to be covered is from 0 to 15 atmospheres. This range will be very useful also for many soil mechanics and foundation engineering purposes. Since all soils have the same general hyperbolic relation between moisture content and tension, it has been found that the best standard medium for surrounding the electrodes in the moisture sensing unit is a very fine sandy loam, low in organic matter, with enough sand to give some stable large pores and not so much clay as to undergo large swelling and shrinking changes with wetting and drying. Also, the specific surface of the standard medium must be sufficiently high to give rapid transmission of moisture at low moisture contents. A soil that has given best results thus far has had the following particle size distribution as determined from water sedimentation rates:

|  | Diameter of particles, mm. | Percent |
| --- | --- | --- |
| Very coarse sand | 2 -1 | 9.4 |
| Coarse sand | 1 0.5 | 8.7 |
| Medium sand | 0.5 -0.25 | 3.5 |
| Fine sand | 0.25 -0.1 | 9.1 |
| Very fine sand | 0.1 -0.05 | 28.7 |
| Silt | 0.05 -0.002 | 32.9 |
| Clay | 0.002-0 | 7.7 |

Soil having the above specification is air-dried, passed through a 2 mm. sieve and packed with gentle tamping around the electrodes in the porous cell.

Although the above soil has been found to be particularly satisfactory, it is to be realized that soils of other types may be employed. In some instances, where maximum precision must be realized, and where hysteresis effects must be minimized, it is desirable to use within the cup a porous material of the same type as that in which moisture or moisture tension is to be determined. Under average conditions, however, for reasons connected with pore size distribution, low shrinkage, and good water conductivity, as enumerated above, the medium used for imbedding the electrodes within the porous cup should have a wide distribution of particle sizes with a peak in the very fine sand and silt sizes. The clay preferably should not be of the expanding lattice type, such as montmorillonite. Preferably, the imbedding media will contain a major proportion of very fine sand and silt of particle size ranging between about 0.002 and 0.1 mm. diameter and a minor proportion of clay finer than about 0.002 mm. diameter and sand coarser than 0.1 mm. diameter.

Imbedding media such as represented by the following table lie within the scope of my invention:

|  | Diameter of particles, mm. | Percent |
|---|---|---|
| Very coarse sand | 2 -1 | 7-12 |
| Coarse sand | 1 -0.5 | 7-12 |
| Medium sand | 0.5 -0.25 | 7-12 |
| Fine sand | 0.25 -0.1 | 7-12 |
| Very fine sand | 0.1 -0.05 | 25-35 |
| Silt | 0.05 -0.002 | 25-35 |
| Clay | 0.002-0 | 5-10 |

Though I have shown and described certain embodiments of my invention, I do not wish to be limited thereto, but desire to include all novelty in the appended claims.

I claim:

1. An electrical sensing unit for soil water comprising electrodes imbedded in a standard granular porous medium which is enclosed in a porous ceramic cup, said electrodes serving for electrical resistance and electrical capacitance measurements of the standard porous medium within the cup.

2. An electrical sensing unit for measuring the condition of soil water which comprises a porous ceramic cup containing a granular porous medium in which two electrodes are buried, said medium being in capillary adjustment with soil water exterior to the cup, and with the electrodes serving for electrical resistance and capacitance measurements of the medium within the cup.

3. An electrical sensing element for measuring the moisture condition of soil which comprises a porous ceramic cup containing a granular porous medium in which two electrodes are buried, the water in said medium being in hydraulic adjustment through the wall of the porous ceramic cup with the water in the exterior surrounding soil and said electrodes being positioned, one within the other, serving for measuring electrical capacitance and reisistance of the standard medium within the cup without influence by the electrical properties of the external surrounding media.

4. An electrical sensing unit for determining the moisture condition of porous media comprising electrodes buried in a standard granular porous medium within a porous ceramic cup, said electrodes serving for resistance and capacitance measurements so that electric field incident to these measurements are confined by electrode arrangement and insulator barriers to the standard porous medium within the cup.

5. An electrical sensing element for determining the moisture condition of soil in accordance with claim 4 in which the standard granular porous medium is sandy loam soil.

6. An electrical sensing unit for determining the moisture condition of soil in accordance with claim 4 in which the standard granular porous medium within the element is a representative sample of the externally surrounding soil in which the soil moisture condition measurement is to be made.

7. An electrical sensing element for measuring the moisture condition of soil in accordance with claim 4 in which the inner electrode is contained in a thin, highly insulating jacket making the sensing element especially responsive to A.C. capacitance measurements.

8. An electrical sensing unit according to claim 4 in which the porosity of the bottom portion of the porous cup is greater than the porosity of the remainder of said porous cup.

9. An electrical sensing unit according to claim 8 in which the air bubbling pressure of said bottom portion of the porous cup is less than about 0.05 atmosphere and the air bubbling pressure of said remainder of said porous cup is at least about 1 atmosphere.

References Cited in the file of this patent

UNITED STATES PATENTS

| 2,729,099 | Rosenthal | Jan. 3, 1956 |
| 2,740,032 | Bouyoucos | Mar. 27, 1956 |
| 2,793,527 | Turner et al. | May 28, 1957 |
| 2,834,201 | Ohlheiser | May 13, 1958 |
| 2,859,318 | Ohlheiser | Nov. 4, 1958 |